United States Patent [19]
Garraffa

[11] Patent Number: 5,381,825
[45] Date of Patent: Jan. 17, 1995

[54] FIRST STAGE SCUBA REGULATOR

[75] Inventor: Dean R. Garraffa, Hungtington Beach, Calif.

[73] Assignee: Under Sea Industries, Inc., Rancho Dominguez, Calif.

[21] Appl. No.: 171,222

[22] Filed: Dec. 20, 1993

Related U.S. Application Data

[63] Continuation of Ser. No. 35,681, Mar. 23, 1993, abandoned.

[51] Int. Cl.⁶ .................................................. G05D 16/02
[52] U.S. Cl. ............................ 137/505.18; 137/505.25
[58] Field of Search ........................ 137/505.18, 505.25

[56] References Cited

U.S. PATENT DOCUMENTS

| | | | |
|---|---|---|---|
| 3,426,790 | 2/1969 | Dey | 137/505.25 X |
| 3,435,843 | 4/1969 | Spencer | 137/505.25 |
| 3,890,999 | 6/1975 | Moskow | 137/505.25 |
| 4,015,630 | 4/1977 | Contreras | . |
| 4,064,899 | 12/1977 | Lehmann | . |
| 4,083,380 | 4/1978 | Huber | . |
| 4,173,986 | 11/1979 | Martin | . |
| 4,230,140 | 10/1980 | Hart | . |
| 4,341,235 | 7/1982 | Nord | . |
| 4,415,001 | 11/1983 | Kent | . |
| 4,484,569 | 11/1984 | Fallon et al. | . |
| 4,722,333 | 2/1988 | Bartos | . |
| 4,798,203 | 1/1989 | Bartos | . |
| 5,123,409 | 6/1992 | Sheffield et al. | . |

*Primary Examiner*—Stephen M. Hepperle
*Attorney, Agent, or Firm*—Leonard Tachner

[57] ABSTRACT

A first stage scuba regulator wherein the intermediate pressure to the second stage regulator increases as tank supply pressure decreases, thus solving the problem of the sensitive second stage at the start of the dive and decreasing the cracking efforts and improving low pressure flow rates at lower tank pressures. The design employed in the present invention for creating an intermediate pressure inversion relies on undersizing the critical balancing shaft of the piston where high pressure air entering from the tank is neutralized between the high pressure O-ring and plastic high pressure seat. By reducing the effective area of a shaft under the O-ring, but in front of the sharp end of the piston, an imbalance is created. This imbalance is in the forward or closing direction of the piston shaft. This extra force decreases the load requirement of the spring and lowers the intermediate pressure at the high supply pressure. As the supply pressure decreases, the closing imbalance decreases and the intermediate pressure begins to rise. This is due to the area force diameter of the smaller unbalanced side of the piston. In addition to providing an effective inversion of the variation in intermediate pressure with supply pressure, the present invention also provides a novel factory adjustment capability so that small manufacturing variances can be accommodated externally of the regulator after it is assembled, without requiring the use of shims or other internal mechanisms which would require disassembly and reassembly.

3 Claims, 5 Drawing Sheets

FIRST STAGE SCUBA REGULATOR

This is a continuation, of application Ser. No. 08/035,681 filed Mar. 23, 1993, now abandoned.

BACKGROUND OF THE INVENTION

1. Field of the Invention

This invention relates to scuba diving apparatus and particularly to a first stage regulator interposed between a tank of high pressure air and a second stage or demand regulator.

2. Prior Art

Demand breathing regulators are designed to operate efficiently when the supply pressure thereto is approximately 135 pounds per square inch. A supply tank easily accommodates breathable gas as to pressures of about 3,000 pounds per square inch. Accordingly, a first stage regulator is conventionally interposed between the tank and the demand regulator to reduce the tank pressure to the designed value. A particularly advantageous first stage regulator design is disclosed in U.S. Pat. No. 4,230,140 to Hart and assigned to the assignee of the present application. This first stage regulator provides a piston subjected on one side to ambient pressure and on the other to downstream air pressure. The piston is arranged to open when the ambient pressure overpowers the downstream pressure by a preset amount determined by a bias spring and to close when downstream pressure rises to the preset amount. Ideally, the pressure exerted by the spring over the effective area of the piston is equal to the intermediate pressure desired for the second stage regulator, such as 135 pounds per square inch. Accordingly, if the pressure in the stem drops below a value less than 125 pounds per square inch above ambient, a spring assisted by ambient pressure moves the piston away from a seated chamber until the ambient pressure and spring pressure are counterbalanced, whereupon the piston moves to a re-seated configuration. Unfortunately, the pressure in a conventional high pressure air tank typically varies from the beginning of the dive when it is maximum at about 3,000 pounds per square inch to the end of the dive when it is reduced to about 500 pounds per square inch or less. This variation of the pressure of the high pressure air tank during the dive, affects the intermediate pressure which varies in the same direction. In other words, when the pressure of the air tank is at maximum, the intermediate pressure is highest and as the air tank pressure is reduced during the dive, the intermediate pressure is also reduced. Thus for example, in the aforementioned prior art design, as the supply pressure varies from 3,000 PSIG to 500 PSIG, the intermediate pressure varies typically from 145 to 125 PSIG.

This reduction in intermediate pressure during the dive period creates a problem in that during the start of the dive, the intermediate pressure is the highest and accordingly, so is the flow rate of air to the second stage regulator. Some second stage regulators can become sensitive from the high intermediate pressure and either leak or freeflow. Both of these conditions can waste air and shorten the dive unnecessarily. Furthermore, toward the end of the dive period, the intermediate pressure is at the lowest, which can cause some second stage regulators to become harder to breath through because they require an increased cracking effort, due to reduced flow rates at the lower tank pressures. The problems associated with high pressure have been recently further exacerbated by improvements in tank material technology which permits tank pressures to be raised to as high as 5,000 PSIG. Accordingly, the need for overcoming the aforementioned disadvantages of the prior art have become even more urgent.

SUMMARY OF THE INVENTION

The present invention meets the aforementioned need by providing a first stage scuba regulator wherein the intermediate pressure to the second stage regulator increases as tank supply pressure decreases, thus solving the problem of the sensitive second stage at the start of the dive and decreasing the cracking efforts and improving low pressure flow rates at lower tank pressures. Like the design of the prior art device shown in the aforementioned patent, pneumatically balanced flow-through is achieved using a one-piece stainless steel piston with a hollow stem that extends through a divided wall in a main body. At one end of the piston, a sharp surface edge orifice is machined into the stem or shaft and at the opposite end a larger diameter disc is sealed by an O-ring in a separate chamber. The regulator has three chambers divided into a high pressure region, a low or intermediate pressure region and an ambient region. The high pressure air enters into the high pressure chamber and then travels through the hollow stem of the piston to the low pressure chamber. As the pressure rises to about 135 PSIG, the large O-ring sealed end of the piston is pushed forward against a pre-loaded spring. The spring load is set so that the needed low pressure requirement can overcome its resistance. The piston stem's sharp edge orifice finally embeds itself into a plastic seat, shutting off the flow of air to the low pressure chamber. Each time air is required from the tank, the second stage demand lowers the pressure behind the large end of the piston. The spring force can then push the piston rearward, unseating the sharp end of the piston and allowing flow to restart.

The design employed in the present invention for creating an intermediate pressure inversion relies on undersizing the critical balancing shaft of the piston where high pressure air entering from the tank is neutralized between the high pressure O-ring and plastic high pressure seat. By reducing the effective area of a shaft under the O-ring, but in front of the sharp end of the piston, an imbalance is created. This imbalance is in the forward or closing direction of the piston shaft. This extra force decreases the load requirement of the spring and lowers the intermediate pressure at the high supply pressure. As the supply pressure decreases, the imbalance decreases and the intermediate pressure begins to rise. This is due to the area force diameter of the smaller unbalanced side of the piston. Another key factor that affects the pressure inversion balancing configuration is the relationship of the end detail of the sharp end of the piston stem to the plastic seat. Some radius will occur in machining no matter how sharp the end is and it is preferred to have some radius on the end detail to prevent over-penetration of the piston which can occur during rapid pressurization of the first stage over repeated pressure cycles. Over-penetration would tend to bury the piston deeply into the plastic seat, causing excessive damage to the seat. However, too much radius is can also be a problem because a greater pressure behind the piston is needed to seal off the end detail effectively. Such increased pressure added to the spring force makes the intermediate pressure unstable. Further consideration must be given to the seating material hardness. Too hard a seating material and again more force behind the piston is needed. Too soft a seating material and the high pressure air will extrude the seat into the piston shaft.

In addition to providing an effective inversion of the variation in intermediate pressure with supply pressure, the present invention also provides a novel factory adjustment capability so that small manufacturing variances can be accommodated externally of the regulator after it is assembled, without requiring the use of shims or other internal mechanisms which would require disassembly and reassembly.

OBJECTS OF THE INVENTION

It is therefore a principal object of the present invention to provide a first stage scuba regulator in which variation in intermediate pressure with tank pressure is inverse so that the highest intermediate pressure occurs at the lowest supply pressure and the lowest intermediate pressure occurs at the highest supply pressure.

It is another object of the present invention to provide a first stage scuba regulator of the type which provides a piston subjected on one side to ambient pressure and on the other to downstream air pressure and so arranged as to open when the ambient pressure overpowers downstream pressure by a preset amount determined by a bias spring and to close when downstream pressure rises to the preset amount and wherein the seat is provided with an O-ring and is externally adjustable to permit factory variation in the intermediate pressure without requiring disassembly of the regulator.

It is still an additional object of the present invention to provide an improved first stage scuba regulator in which the cracking effort required to supply breathable air in a connected second stage regulator is effectively reduced with lower tank supply pressures.

It is still an additional object of the present invention to provide an improved first stage scuba regulator having a reduced intermediate pressure at high tank pressures, whereby to prevent leakage or freeflow in a second stage regulator connected thereto.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
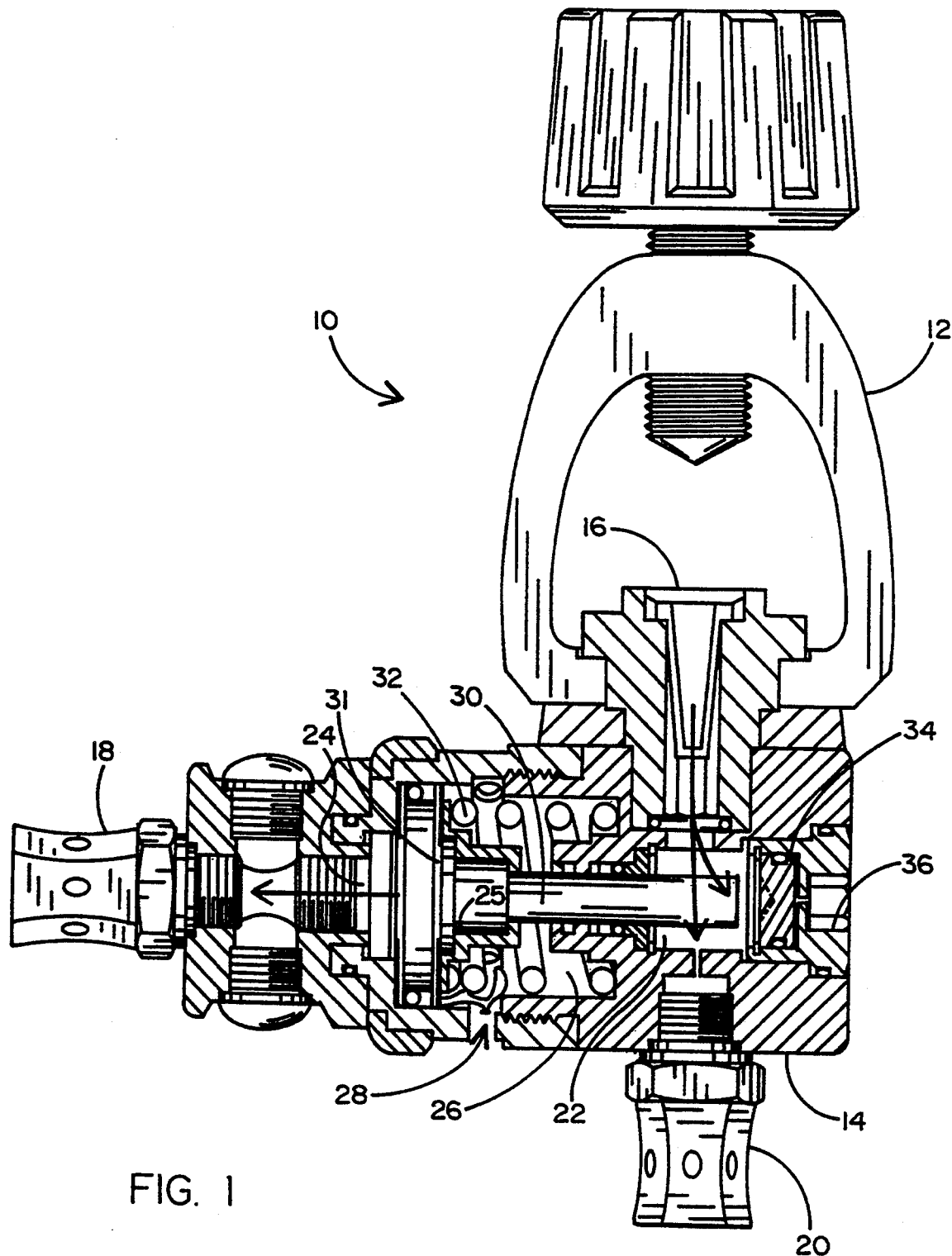
FIG. 1 is a longitudinal sectional view of a first stage regulator of the type in which the present invention may be implemented.

Referring now to FIG. 1, it will be seen that an improved first stage scuba regulator 10 in accordance with the present invention, comprises a yoke 12 and a regulator body 14, the latter having a high pressure air inlet 16, an intermediate pressure air outlet 18 and a console connector 20. The yoke is configured to assure a reliable and secure interconnection between the high pressure air inlet 16 and a suitable high pressure supply tank (not shown). The intermediate pressure air outlet 18 is designed to be connected by a hose to a suitable second stage regulator through which the diver breathes air. The console connector 20 is also designed to be connected by means of a hose to a suitable tank pressure indicator, such as one on a console unit worn by the diver on his wrist or forearm.

The regulator body 14 is divided into three distinct pressure chambers, namely a high pressure chamber 22, an intermediate pressure chamber 24 and an ambient pressure chamber 26. The high pressure chamber 22 is in direct communication with the high pressure air inlet 16 and thus receives air from the high pressure tank at the tank pressure. Intermediate pressure chamber 24 is, by virtue of intermediate pressure air outlet 18 and the hose (not shown), connected to the second stage regulator (also not shown) to which it provides air at the intermediate pressure.

A piston 25 is positioned between the high pressure chamber 22 and the intermediate pressure chamber 24 and as will be seen hereinafter, provides the pressure reduction between the high pressure chamber and the intermediate pressure chamber, which are in turn separated by an ambient pressure chamber 26, the latter having an ambient port 28 for receiving an environmental protective fluid therein. The piston 25 has a stem 30, terminating at the high pressure chamber 22 and a large end 31, one surface of which forms a wall of the intermediate pressure chamber 24 and the other surface of which forms a wall of the ambient pressure chamber 26. Seen further in FIG. 1, spring 32 is provided in the ambient pressure chamber 26 and has one end that bears against the ambient pressure chamber side of the piston end 31 and is configured to apply a force against the piston, tending to move it from the high pressure chamber towards the intermediate pressure chamber.

As will be seen hereinafter, the piston 25 has a hollow channel 49 (see FIG. 3) therethrough from the end of the stem 30, through the intermediate pressure chamber surface of the large end 31 of the piston. When the stem 30 of the piston 25 is not seated against a seat 34, high pressure air in the high pressure chamber 22 can enter the hollow channel of the piston 25 and flow through the piston toward and into the intermediate pressure chamber until the pressure in the intermediate pressure chamber 24 becomes high enough to overcome the forces tending to push the piston in the direction of the intermediate pressure chamber, including the compression force of the spring 32. At this point, the pressure is high enough to move the piston towards the stem end until the stem is seated against the seat 34, cutting off any further flow from the high pressure chamber to the intermediate pressure chamber. When the diver breathes in air through the second stage regulator, the air pressure in the intermediate pressure chamber 24 drops slightly, thereby allowing the piston to become unseated and allowing flow to resume from the high pressure chamber 22 through the stem to the intermediate pressure chamber 24. Eventually, the pressure in the intermediate pressure chamber is again stabilized and the piston becomes again reseated against the seat 34.

Figure 2:
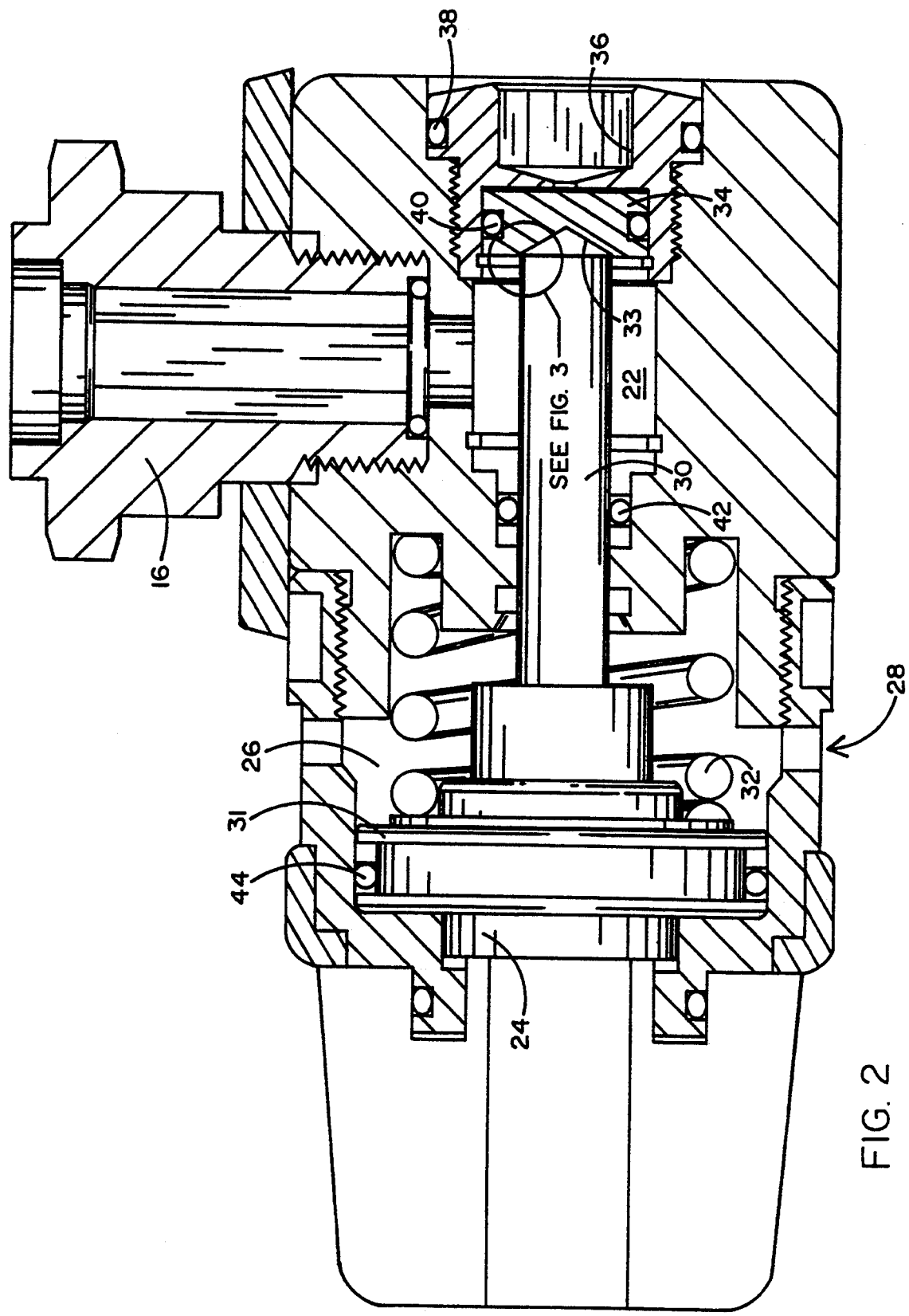
FIG. 2 is an enlarged cross sectional view of the regulator of FIG. 1.

The detailed construction of the interior of the regulated body 14 may be understood best by referring to FIG. 2, wherein it will be seen that the seat 34 is provided with a conically shaped seat surface 33 and furthermore that the seat 34 is contained within an adjustment member 36 which is threadably engaged with the body 14. It will also be seen that the adjustment member 36 provides an 0-ring 38 which forms a seal between the adjustment member and the body. It will also be seen that the seat 34 also provides an O-ring 40 which forms a seal between the seat 34 and the adjustment member 36. It will also be seen in FIG. 2 that a high pressure O-ring 42 is provided around the stem 30 of the piston 25 at the end of the high pressure chamber 22 closest to the ambient pressure chamber 26. Thus, O-ring 42 helps provide a seal between the high pressure chamber and the ambient pressure chamber. It will also be seen in FIG. 2 that an O-ring 44 is provided around the large end 31 of the piston 25, which helps provide a seal between the ambient pressure chamber 26 and the intermediate pressure chamber 24.

Figure 3:
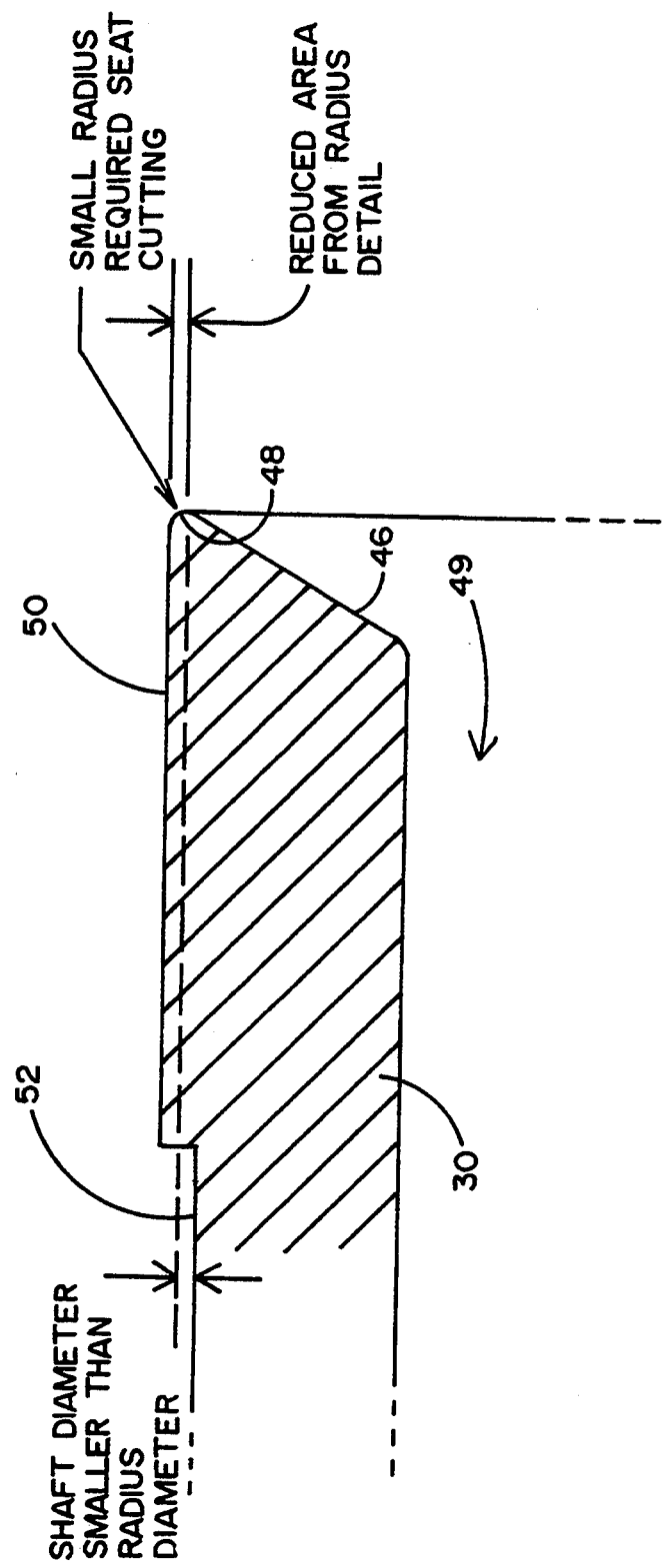
FIG. 3 is a greatly enlarged cross-sectional view of a portion of the piston at its seating end and indicating a modification to the piston shaft in accordance with the invention.

One of the advantageous features of the present invention that can be readily observed in FIG. 2, is the adjustment capability for an intermediate pressure setting at the factory, without disassembly and reassembly of the body 14. This adjustability feature is made possible by the adjustment member 36 and the O-rings 38 and 40, which permit the position of the seat 34 to be externally modified relative to the piston 25. Thus, for a given spring constant for spring 32, the nominal intermediate chamber pressure may be varied by simply threading or unthreading the adjustment member 36 relative to the body 14. However, the principal feature of the present invention resides in the aforementioned inverted relationship between high pressure and intermediate pressure thereof. To understand this variation, one must first understand the reason for any variation between high pressure and intermediate pressure during the dive period. Variation in this pressure relationship is primarily due to unbalanced forces on the stem surfaces within the high pressure chamber 22. Of course, ideally, if the stem 30 were everywhere precisely the same diameter and if the diameter of the stem end, in contact with the seating surface 33 of seat 34, were precisely the same as the diameter of the stem, there would be no unbalancing forces on the stem in the high pressure chamber. The intermediate pressure would remain essentially constant, irrespective of the variation in high pressure due to a reduction in air in the high pressure tank during the dive. However, as seen in FIG. 3, the radius of the stem end that comes in contact with the seat surface 33, reduces the area of the stem at that interface. Consequently, the diameter of the stem shaft behind the end of the stem is larger than the diameter of the contact line formed by the radius end of the stem and the seat surface. Consequently, there is a force imbalance which tends to push the piston towards the intermediate chamber and away from the seating surface. This imbalance is highest when the pressure from the high pressure air supply is the highest. In order to overcome this imbalance at the highest air pressure, the intermediate pressure must be higher to seat the piston against the stem surface. Thus, as seen in FIG. 3, because of the radius of the piston sealing surface 48 the angled end 46 leading to the hollow channel 49 from the exterior of the stem, an imbalance occurs. Consequently, the diameter of the full radial surface 50 of the piston stem needed for perfect balancing is now too large for perfect balancing and as a result, there is a force directed toward the large end of the piston that adds to the compression force of the spring 32, in proportion to the pressure in the high pressure chamber 22.

Figure 4:
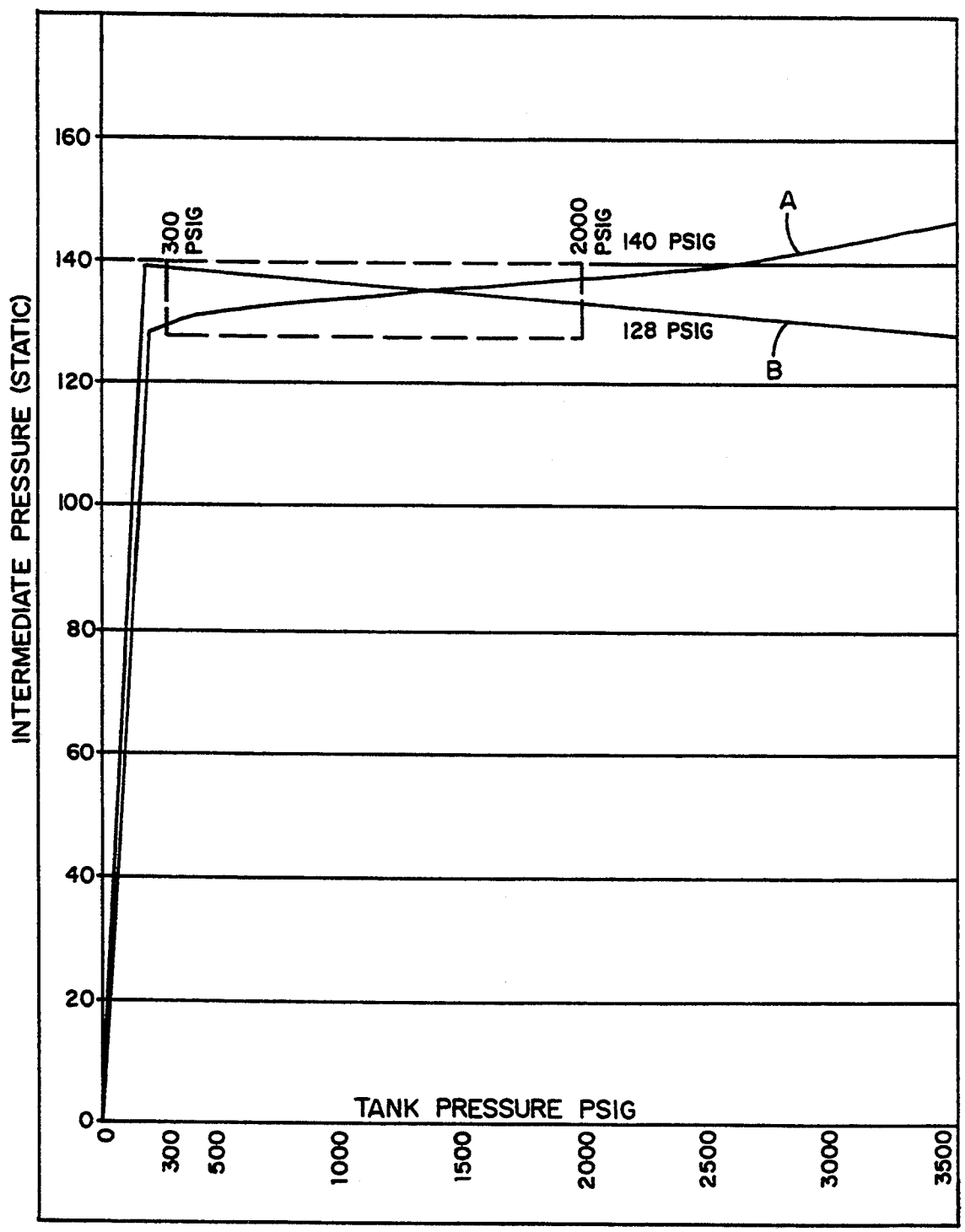
FIG. 4 is a graphical illustration of a variation in static intermediate pressure with tank pressure, comparing the prior art variation with the variation of the present invention.

The effect of this imbalance can be seen in the graph of FIG. 4 which illustrates the variation in intermediate pressure versus tank pressure. More specifically, the graph labelled "A" shows that above about 300 pounds per square inch tank pressure, the intermediate pressure varies monotonically and proportionally to the tank pressure, particularly through the important region which is indicated by the dotted line rectangle shown in FIG. 4. This rectangle encompasses the region of intermediate pressure variation with tank pressure which is required to assure adequate and safe breathing for a diver throughout the range of tank pressure variation.

The inversion effect of the present invention is derived by changing the diameter of the piston stem shaft behind the front end of the piston stem, but still in the high pressure chamber so that the force imbalance noted previously in conjunction with FIG. 3 and 4 is effectively inverted, wherein the force tends to direct the piston toward the seat 34 and wherein the magnitude of that force is proportional to the high pressure in the high pressure chamber 22. Thus, as seen in FIG. 3, the piston 30 shaft diameter is reduced to a radial surface 52 which is smaller than the radial surface 50 and is, in fact, smaller than the diameter of the seating surface interface at the end of the stem.

Figure 5:
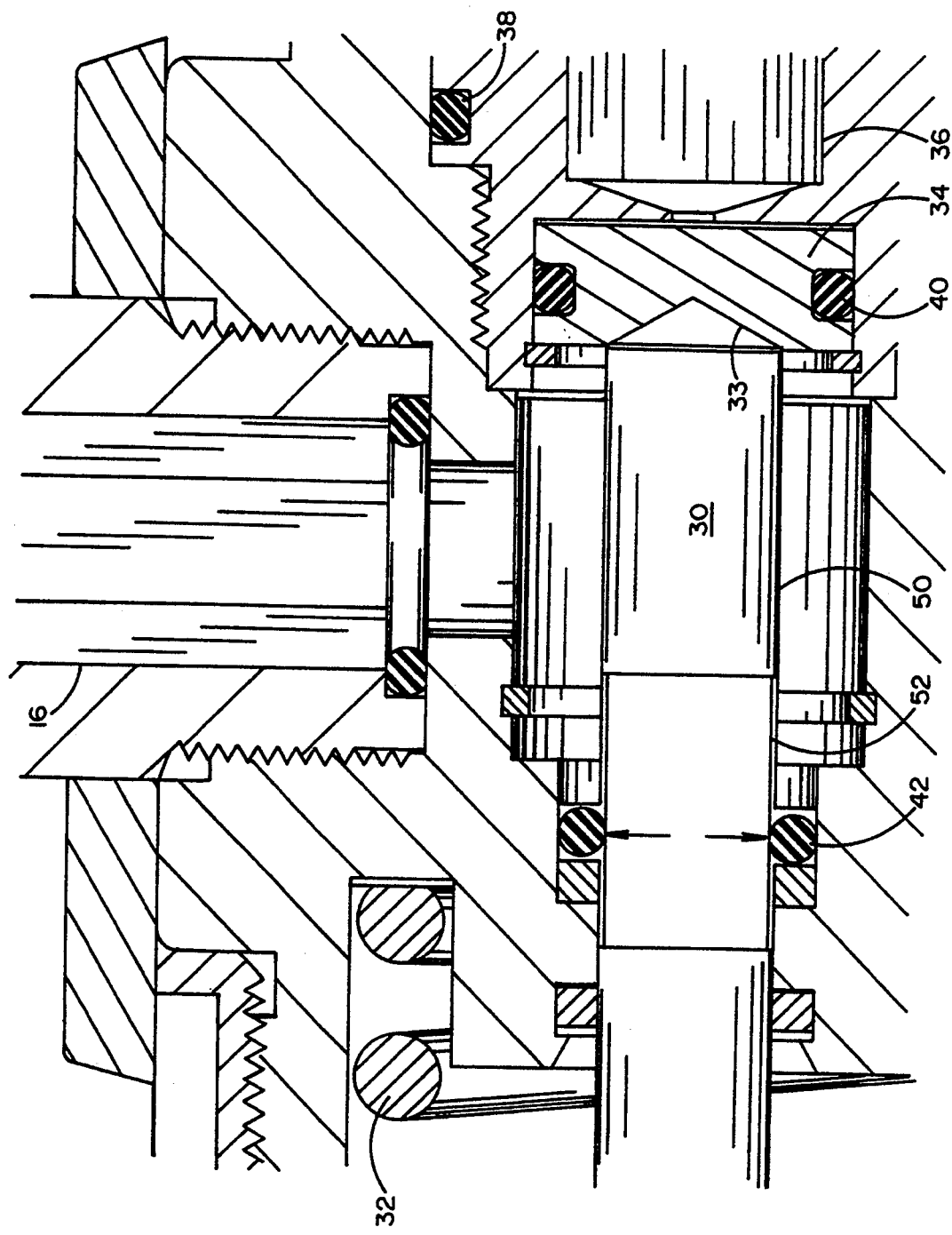
FIG. 5 is a greatly enlarged cross-sectional view of that portion of the regulator of the present invention including the modified portion of the piston therein, illustrating the manner in which the invention is implemented in a preferred embodiment.

This reduction in stem diameter may be better understood by referring to FIG. 5, wherein it will be seen that the stem 30 has its radial surface reduced in the high pressure chamber adjacent the O-ring 42 which as previously indicated, seals the high pressure chamber from the ambient pressure chamber. The reduced radial surface 52 causes a force imbalance within the high pressure chamber which tends to move the piston to the right or towards the seating surface 33 and the magnitude of this imbalancing force is directly proportional to the pressure in the high pressure tank. Consequently, when the pressure in the high pressure tank is at maximum, the intermediate pressure required to seat the stem and prevent air flow is lower than it is when the high pressure in the air tank is reduced during the dive period. This variation in intermediate pressure with high pressure may be seen as curve "B" of the graph of FIG. 4, wherein it will be seen that the intermediate pressure is maximum at the low end of the tank pressure variation and minimum at the high end of the tank pressure variation. Of course, it will be understood that the precise manner in which the diameter of the stem shaft is reduced, need not be done in the manner shown in the preferred embodiment disclosed in the accompanying figures. More specifically, it need not be done in a stepped configuration as shown in FIG. 5, but it may instead be done in a gradual or tapered manner, whereby the stem diameter decreases along the high pressure chamber from the seated end of the stem shaft to the end immediately adjacent the O-rings 42. In either case, an unbalancing force is created which reverses the variation of intermediate pressure with high pressure.

It will now be understood that what has been disclosed herein, comprises an improved first stage regulator for scuba diving, the improvement thereof producing two distinct advantages. One such advantage is the externally adjustable position of the seating surface which allows a factory setting of nominal intermediate pressure, without requiring disassembly and reassembly of the regulator body to effect such adjustment. However, a more significant advantageous feature of the present invention resides in its inverted relationship between intermediate pressure and high pressure, resulting from a controlled variation in the diameter in the piston stem within the high pressure chamber thereof, to create an unbalancing force which tends to move the piston towards the seat, with greater magnitude at high tank pressure and reduced magnitude at low tank pressure, whereby to cause the intermediate pressure of the regulator hereof to vary inversely with tank pressure. Consequently, at high tank pressures, the intermediate pressure of the first stage regulator of the present invention is at its lowest level and it increases with decreasing tank pressure, thereby overcoming the aforementioned disadvantages of the prior art.

Those having ordinary skill in the art to which the present invention pertains, will now as a result of the applicant's teaching herein, perceive various modifications and additions which may be made to the invention. By way of example, as previously described, the precise manner in which the stem shaft diameter can be varied is not to be limited to the specific step configuration shown herein and may alternatively be tapered along the length of the stem shaft. Other such modifications and additions will become apparent as a result of the applicant's teaching herein and accordingly it will be understood that the present invention is not to be limited to the specific embodiment shown herein, but is only limited by the claims appended hereto and their equivalents.

I claim:

1. An improved first stage scuba regulator, the regulator of the type having a body having a high pressure chamber and an intermediate pressure chamber separated by a hollow piston having a large diameter end and a small diameter seating end interconnected by an elongated stem; and a plastic conical seat in the high pressure chamber, the piston separation from the seat allowing flow of air from the high pressure chamber to the intermediate pressure chamber through the piston and reseating of the piston in the seat stopping such flow of air;

the improvement comprising:

said stem having a smaller diameter within said high pressure chamber toward said large diameter end than the diameter at said seating end, creating a force imbalance on said stem within said high pressure chamber, said force imbalance being proportional to the pressure in said high pressure chamber; and wherein said seating end of said piston comprises a rounded seating surface and wherein said stem smaller diameter is smaller than the diameter of said seating end at said rounded seating surface.

2. The improvement recited in claim 1 further comprising:

an adjustment member, said conical seat being housed within said adjustment member, said adjustment member being threadably engaged with said body for external axial adjustment of the position of said seat relative to said stem for modifying the pressure in said intermediate pressure chamber.

3. The improvement recited in claim 1 wherein the difference in said diameters is sufficient to cause the pressure in said intermediate pressure chamber to vary inversely with the pressure in said high pressure chamber.

* * * * *